UNITED STATES PATENT OFFICE.

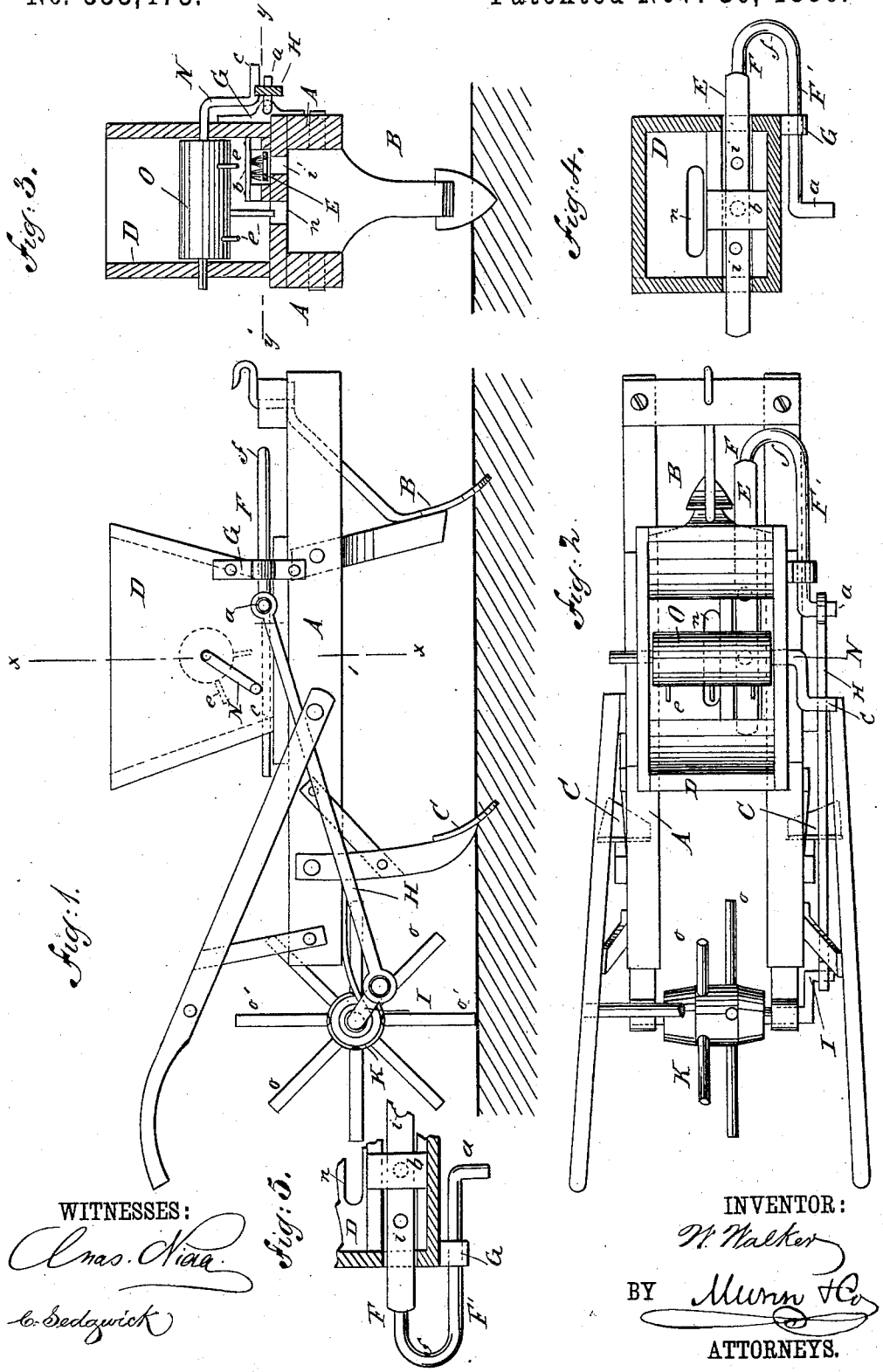

WILLIAM WALKER, OF WEIMAR, TEXAS.

COMBINED CORN AND COTTON PLANTER.

SPECIFICATION forming part of Letters Patent No. 353,473, dated November 30, 1886.

Application filed March 24, 1886. Serial No. 196,389. (No model.)

*To all whom it may concern:*

Be it known that I, WILLIAM WALKER, of Weimar, in the county of Colorado and State of Texas, have invented a new and Improved Combined Corn and Cotton Planter, of which the following is a full, clear, and exact description.

My invention relates to the construction of a planter so arranged that by simply shifting the connection between the corn-slide and the crank-arm of an agitator the device may be adjusted to act as a planter of corn or cotton, but a single connecting-rod being employed in connection with a single driving crank-shaft to operate the planter both as a cotton and a corn planter.

The invention consists in the peculiar construction and arrangement of parts, as hereinafter fully described, and pointed out in the claims.

Reference is to be had to the accompanying drawings, forming a part of this specification, in which similar letters of reference indicate corresponding parts in all the figures.

Figure 1 is a side view of my improved corn and cotton planter. Fig. 2 is a plan view thereof. Fig. 3 is a vertical cross-sectional view taken on line $x\ x$ of Fig. 1. Fig. 4 is a sectional plan view of the hopper and corn slide, taken on line $y\ y$ of Fig. 3; and Fig. 5 is a view similar to Fig. 4, illustrating a modified construction.

In the construction as illustrated in the drawings above referred to, A represents the frame of the planter, which is provided with an opener, B, and two closing-shovels, C. Upon the frame A there is mounted a hopper, D, upon one side of which there is arranged a corn-slide, E, formed with apertures $i\ i$, and aperture $i'$ being formed in the bottom of the hopper. The slide E is provided with a forwardly-projecting metallic arm F, which is carried backward at $f$ in U form, the rearwardly-extending leg F' being guided and upheld by a bearing, G, that is fixed upon the outer side of the hopper, as shown in Figs. 1, 3, and 4. The extreme end of the leg F' is bent out at right angles in order that the outwardly-projecting end $a$ may be engaged by a connecting-rod, H, that is carried by the crank-arm I, formed upon one end of the shaft of an armed wheel, K, of novel construction, the parts being arranged so that as the wheel K revolves (which of course it will be understood runs in contact with the ground) a reciprocating motion will be imparted to the slide E, and the openings $i\ i$, formed in said slide, will be brought into register with the aperture $i'$ of the hopper D, a brush $b$ being as usual arranged just above the slide.

When the planter is to be used for planting cotton, the connecting-rod H is withdrawn from connection with the pin $a$ and brought into engagement with the pin $c$ of the crank-arm N, formed on the shaft of an agitator, O, mounted, as shown, within the hopper D. This agitator is provided with extending pins $e\ e$, as shown best in Fig. 3. In the bottom of the hopper there is an elongated opening, $n$, through which the cotton-seed is passed, this opening being closed, however, when the device is used for a corn-planter by a leaf arranged to fit over the bottom of the hopper, and at the time the device is used for planting cotton the slide E may be covered, if desired; but if the slide is moved so that the apertures $i\ i'$ are not in register there will be no absolute necessity of covering the slide by an extra leaf, as in the case of the aperture $n$, through which the cotton-seed is dropped.

The crank-arm N, it will be seen, is somewhat longer than the crank I, so that as the crank I is rotated a reciprocating motion will be imparted to the crank N, and consequently to the agitator O.

The wheel K is formed with two rows or series of spokes, $o\ o'$, arranged on each side of the center line of the hub of the wheel. These spokes $o\ o'$ alternate; but each of said series projects from the hub in a line at right angles to the axis of said hub, so that there will be a space between the two sets of spokes, the idea being to prevent the spokes from pressing in the seed, the parts being arranged so that the spokes will strike on each side of the drill.

It will of course be understood that the arm of the slide could be arranged to project from the rear of the hopper instead of from the front, as heretofore described, and in Fig. 5 I illustrate a construction showing the arm as extending to the rear of the hopper.

Having thus fully described my invention, what I claim as new, and desire to secure by Letters Patent, is—

1. In a combined corn and cotton planter, the combination, with a frame, a hopper mounted thereon, and a wheel journaled in the rear part of the same, of the seed-slide E, provided on its forward end with the bent arm F, having the rearwardly-extending leg F'a, and the connecting-rod H, substantially as herein shown and described.

2. In a combined corn and cotton planter, the combination, with a crank-shaft driven by an armed wheel, of a slide having an arm, F, bent to U form, so as to have a rearwardly-extending leg F', that is guided by a bearing, G, said rearwardly-extending leg being provided with an extending end, a, upon which there is fitted a connecting-rod, H, that also engages with the crank-shaft, substantially as described.

WILLIAM WALKER.

Witnesses:
J. A. HALL,
J. E. MATTHEW.